United States Patent [19]

Nelson

[11] 4,025,927

[45] May 24, 1977

[54] MULTILAYER MAGNETIC IMAGE RECORDING HEAD

[75] Inventor: Alfred M. Nelson, Redondo Beach, Calif.

[73] Assignee: Cubic Photo Products Division, Los Angeles, Calif.

[22] Filed: July 10, 1975

[21] Appl. No.: 594,583

[52] U.S. Cl. .............................. 346/74.1; 360/122; 360/123

[51] Int. Cl.² ................... G03G 19/00; G11B 5/22; G11B 5/20

[58] Field of Search .......... 346/74.1, 139 A, 139 C; 360/123, 122, 126

[56] References Cited

UNITED STATES PATENTS

| | | | |
|---|---|---|---|
| 3,254,626 | 6/1966 | Uemura | 346/74.1 |
| 3,611,417 | 10/1971 | Sauter | 360/123 |
| 3,648,264 | 3/1972 | Gruczelak | 360/123 |
| 3,662,361 | 5/1972 | Mee | 360/123 |
| 3,685,144 | 8/1972 | Trimble | 360/123 |
| 3,781,476 | 12/1973 | Hanazono | 360/123 |
| 3,881,192 | 4/1975 | Ballinger | 360/123 |

OTHER PUBLICATIONS

IBM Tech. Discl. Bull., vol. 15, No. 2, July 1972, p. 5161, "Horizontal Thin-Film", Watrous.

*Primary Examiner*—Jay P. Lucas
*Attorney, Agent, or Firm*—Lindenberg, Freilich, Wasserman, Rosen & Fernandez

[57] ABSTRACT

A head for producing magnetic images of fine detail, including a group of recording elements spaced perpendicular to the movement of a magnetic tape and a power source that passes current pulses through the recording elements to create magnetic fields that magnetize small regions of the tape. Each recording element includes an elongated conductor with a thin nickel layer nearest the magnetic tape and a thick copper layer on the side of the nickel layer opposite the tape, the copper layer having a small gap therein at a predetermined recording location. Accordingly, the center of current flow is normally through a middle portion of the copper which is too far from the magnetic tape for the resulting magnetic field to magnetize the tape, except at the recording location where the current passes through the nickel layer which is close enough to the tape to magnetize it.

10 Claims, 9 Drawing Figures

MULTILAYER MAGNETIC IMAGE RECORDING HEAD

BACKGROUND OF THE INVENTION

This invention relates to a magnetic recording apparatus.

In some printing applications, it is necessary to print alpha-numeric characters or other images of fine detail. A matrix printer which can print a column of about 32 closely spaced dots and about the same number of rows for each character, can create substantially any style of character. However, where the characters are to be of typical print size such as one tenth inch high, the 32 print or recording elements must be spaced about three thousandths inch apart. It is difficult to manufacture such small elements and mount them at such a small spacing, and it is also difficult to do this at relatively low cost.

SUMMARY OF THE INVENTION

In accordance with one embodiment of the present invention, a magnetic recording head is provided which can be utilized in a printing machine of relatively simple construction which can print small elements of fine detail. The recording head includes a group of recording elements which are closely spaced along a line perpendicular to the path of a magnetic recording tape, so that current through the elements produces magnetic fields that record magnetic spots on the tape. Each recording element includes an electrical conductor with a center of conduction spaced more than a predetermined distance from the magnetic tape path except at a small recording location where the center of conduction lies close enough to the magnetic tape path so that a current of predetermined magnitude through the recording element records a spot on the magnetic tape. The conductor of each recording element is formed by a thin layer of nickel which extends close to the magnetic tape path and a thick layer of copper lying on a face of the nickel opposite the tape path, with the copper layer having a gap at the recording location. When a current pulse is passed through the recording element, the center of conduction lies near the middle of the copper layer, so that the resulting magnetic field is not strong enough at the tape to magnetize it. However, at the gap in the copper layer, the current must pass through the nickel layer which lies close enough to the magnetic tape so that the resulting magnetic field is strong enough at the tape to magnetize it. A series of pulses applied to the recording elements as the magnetic tape moves thereby, creates a magnetic image on the tape. Toner is applied to the magnetic image on the tape, and the toner is transferred to paper or other print medium to produce a visible image.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
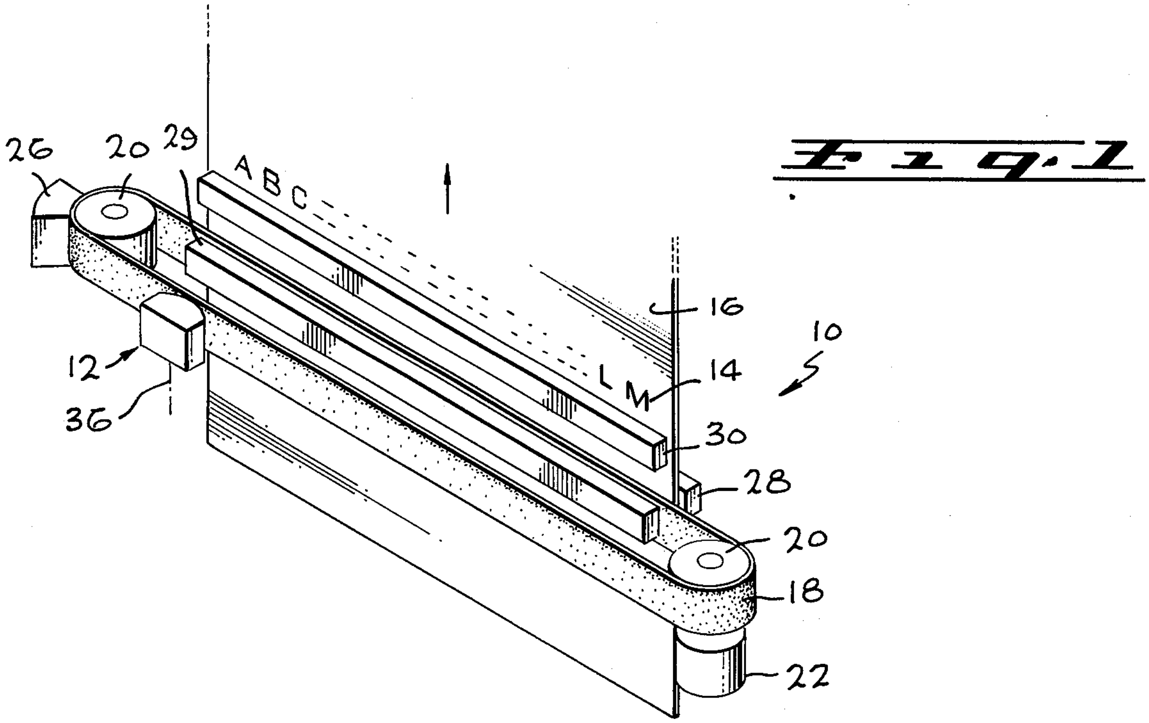
FIG. 1 is a simplified perspective view of a printing machine constructed in accordance with the present invention.
Figure 2:
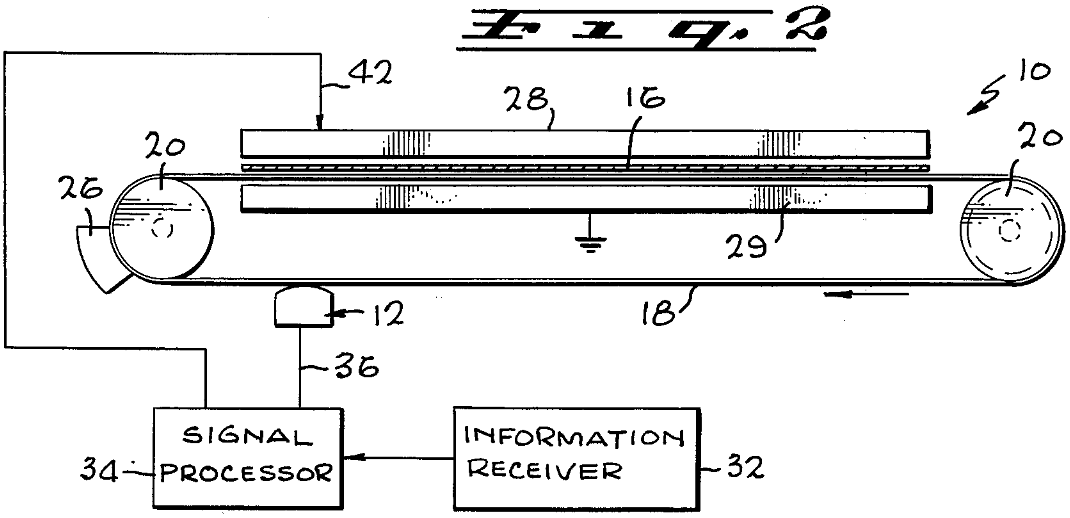
FIG. 2 is a plan view of the printing machine of FIG. 1, and also showing some of the circuitry thereof.

FIGS. 1 and 2 illustrate a printing machine 10 which employs a recording head apparatus 12 of the present invention to form characters 14 of fine detail on a web of paper 16 or other print medium. The machine includes a magnetic recording tape 18 which is guided along a predetermined path by a roller 20, and which is driven along the path by a motor 22, that turns one of the rollers. The path of the recording tape 18 extends across the recording head apparatus 12, where magnetic images are recorded on the tape. The tape then passes across a toner applying station 26 where toner is applied to the tape so that the magnetized regions receive a coating of toner particles. The tape then moves in front of the paper 16 to which the toner particles are to be transferred. A transfer head apparatus 28 is energized to cause the toner on the magnetic tape 18 to be transferred to the paper. The paper is advanced by rollers, and a fuser 30 (FIG. 1) fixes the toner to the paper, so that a permanent image is formed on the paper.

The particular machine 10 which is illustrated, is designed for printing of lines of characters on paper. Information which is received in a receiver 32 is delivered to a signal processor 34 which delivers signals to the recording head apparatus 12 and to the transfer head 28. When signals representing characters are received, signals are delivered over line 36 to the recording head apparatus 12 to cause the recording of magnetic images on the tape. The tape moves past the toner station 26 where the magnetized images are coated with toner, and the toner-coated tape moves in front of the paper 16. When a line of characters lies in front of the paper, a current pulse is delivered over line 42 to the transfer head 28 which lies behind the paper to create an electric field which causes the toner particles on the tape 18 to move from the tape against the paper 16. An electrically grounded strip 29 lies opposite the head 28 to establish a uniform electric field. After each line of characters is printed on the paper, the paper is advanced so that a new line can be printed, while the previously printed line is fused by the fuser 30.

Figure 3:
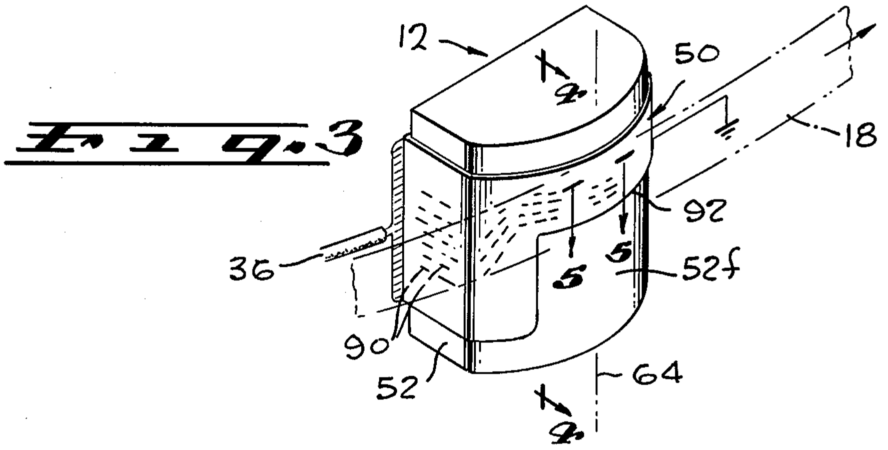
FIG. 3 is a perspective view of the recording head apparatus of the machine of FIG. 1.
Figure 4:
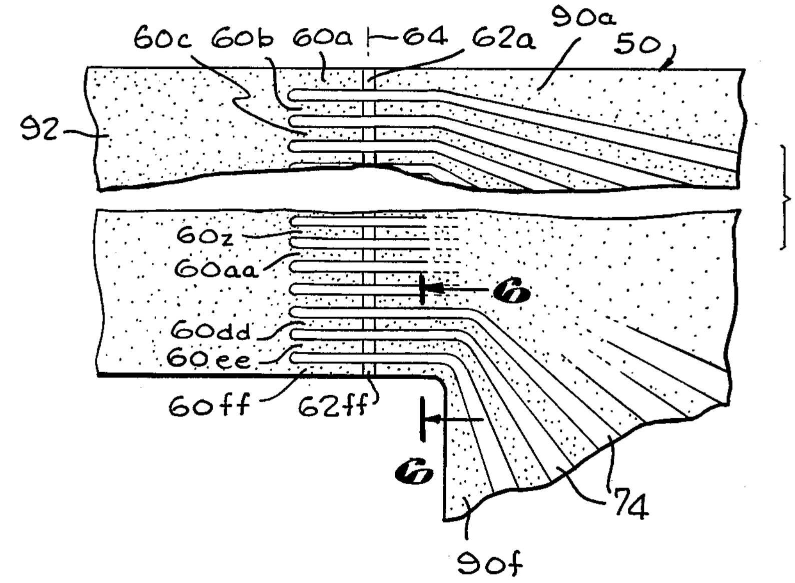
FIG. 4 is an underside view of a portion of the recording head of FIG. 3, taken on the line 4—4 of FIG. 3.

FIGS. 3–6 illustrate details of the recording head 12 which permits the recording of magnetic character images of fine detail on the magnetic recording tape 18. As shown in FIG. 3, the recording head apparatus 12 includes a thin sheet-like recording head or device 50 which is mounted on a block-like support 52 that has a convex face 52*f*. The recording device 50 (FIG. 4) has a group of thirty-two recording elements 60*a*–60*ff* which each include a recording location 62a–62ff that can magnetize a small area of the magnetic recording tape. The recording locations 62 lie side-by-side and are spaced along a recording line 64 which extends transverse to the direction of movement of the magnetic recording tape 18 past the recording head.

Figure 5:
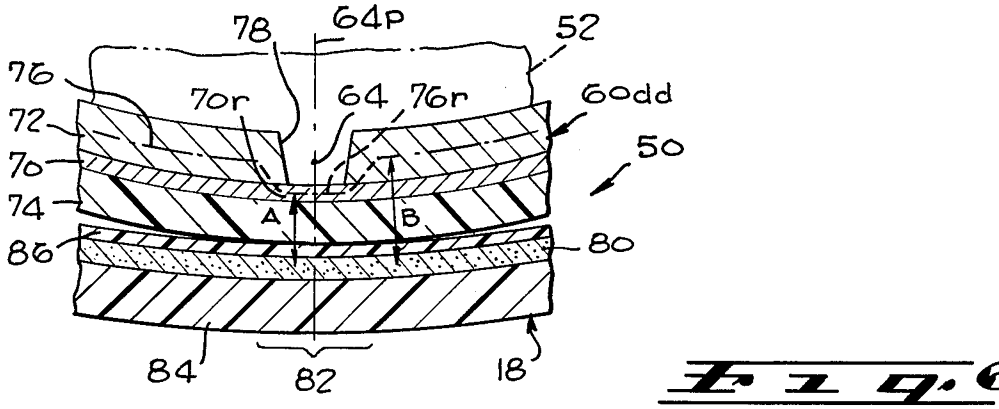
FIG. 5 is an enlarged view taken on the line 5—5 of FIG. 3.
Figure 6:
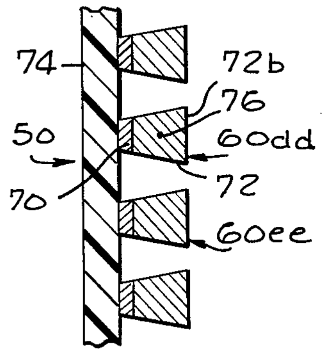
FIG. 6 is an enlarged view taken on the line 6—6 of FIG. 4.

FIGS. 5 and 6 illustrate additional details of the recording device 50 which records images in a layer 80 of magnetitizable material of the magnetic recording tape 18, and showing the details of one of the recording elements 60dd thereof. The recording element 60dd includes a first or underlayer 70 of moderately good conductivity such as nickel, and a second or overlayer 72 of high conductivity material such as copper. The recording device 50 includes a supporting film 74 of nonmagnetic material such as polyester, which supports the nickel layer 70 of the recording element 60dd as well as each of the other recording elements. When a current is passed lengthwise along the printing element 60dd, the current flows along a path 76, most of which lies near the center of the copper layer 72. This is because copper has a conductivity about six times greater than nickel, and because the copper layer is thicker than the nickel layer. Near a plane 64p which includes the recording line 64, the recording element 60dd has a gap 78 in the copper layer 72. As a result, the current path 76 must extend through the nickel layer 70. Along the current path region 76r where the current passes only through the nickel layer, the center of current flow is located a relatively small distance A from a layer of magnetizable material 80 on the recording tape 18. The magnitude of the current pulse passing through the recording element 60dd, is chosen so that the resulting magnetic field at the current path portion 76r is strong enough to magnetize the material 80 of the recording tape, but with the current magnitude small enough that the magnetic field created along the rest of the current path will not magnetize the material 80 at the distance B between adjacent portions of the current path and the tape layer. As a result, only a small region 82 of the magnetizable material 80 of the tape will become magnetized by the current pulse which is passed longitudinally through the recording element 60dd. It may be noted that the recording tape 18 includes a supporting base 84 of a material such as Mylar which supports the layer 80 of magnetizable material such as chromium dioxide, and that a thin low friction film 86 of material such as polyester is provided over the magnetizable layer 80. The particles of the layer 80 are preferably oriented transverse to the length of the tape, and have a highly square hysteresis loop characteristic.

As shown in FIG. 6, each recording element such as 60dd is preferably tapered in cross-section with the side nearest the path of the recording tape, at the layer 70, being of narrowest width. This tapering helps to assure recording only at the recording locations, in two ways. The tapering results in the center of current at 76 along most of the recording element, lying nearer the widest portion or base 72b of the copper layer, which results in the distance B from the center of conduction to the recording material of the magnetic tape being greater. Additionally, when the current passes through the recording portion 70r of the nickel layer along the gap 78 in the copper, the current flows along a nickel layers of small width. This results in higher current intensity, and therefore greater magnetic intensity immediately opposite the center of the nickel layer.

The recording device 50 can be constructed at relatively low cost, by well known etching or deposition processes, although the tapering may not be as smooth or uniform for elements of small width. The process can involve the forming of a multilayer sheet that includes two materials of different conductivity such as nickel and copper, etching grooves across part of the sheet to leave the elongated elements that are connected together at one end to form a common area or base 92, and etching narrow gaps 78 in the layer of higher conductivity. In one method, a layer of copper is deposited over a layer of nickel to form a nickel-copper sandwich. The copper face of the sandwich is then attached to a support and a resist is applied over the nickel layer in the pattern shown in FIG. 4. Of course, such a pattern can be initially drawn to a large scale and photo-reduced, and then used to expose resist to sensitize it, all in a well known manner. The sandwich is then dipped in an etchant that etches both the nickel and copper to produce elements tapered in cross-section, of the type shown in FIG. 6. The resulting etched sandwich is then attached to the polyester sheets 74. Resist is then utilized over the copper layer except where the gaps 78 are to be formed, and the device is then immersed in an etchant that etches copper but not nickel. Of course, a variety of methods can be employed, especially where tapering of the recording elements along their thickness is not required, all in accordance with methods well known in the art. The recording device 50 then can be mounted on the support 52 in a manner shown in FIG. 3. One process results in there being an additional nickel layer lying over the copper base 72b (FIG. 6), but which has substantially no effect on the subsequent operation of the device.

In order to facilitate connects to the different recording elements 60a–60ff, each of the elements is formed with a tail 90a–90ff (FIG. 4), with the tails being tapered in width and extend in a radiating pattern from the region of the recording location. This provides relatively wide lead ends which facilitates electrical connections thereto. The end of the recording device 50 opposite the leads 90 forms a common base or lead 92 that is coupled to all of the recording elements. Along the recording location, the recording elements are in the form of narrow strips that extend parallel to one another and parallel to the path of the magnetic tape. After the recording device is mounted on the support 52, the leads are coupled to multiple leads of the line 36 that is connected to the signal processor 34.

Figure 7:
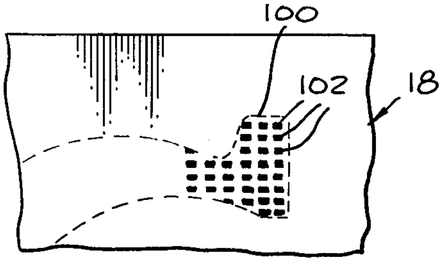
FIG. 7 is an enlarged view showing a portion of a character formed by the machine of FIG. 1.

FIG. 7 illustrates the form of the magnetic image which can be recorded on the magnetic recording tape 18, the image 100 representing the upper portion of a stylized form of the letter "C" (in practice a mirror image is formed of the desired character to be printed). The image is formed by a series of magnetized areas 102 which are located in columns corresponding to the spacings of the recording locations on the recording elements, and in rows separated from one another that represent the distance which the tape 18 has moved between repeated current pulses through the recording elements. When the magnetic image is dusted with toner and the toner is transferred to paper, a continuous image can be formed on the paper.

Figure 8:
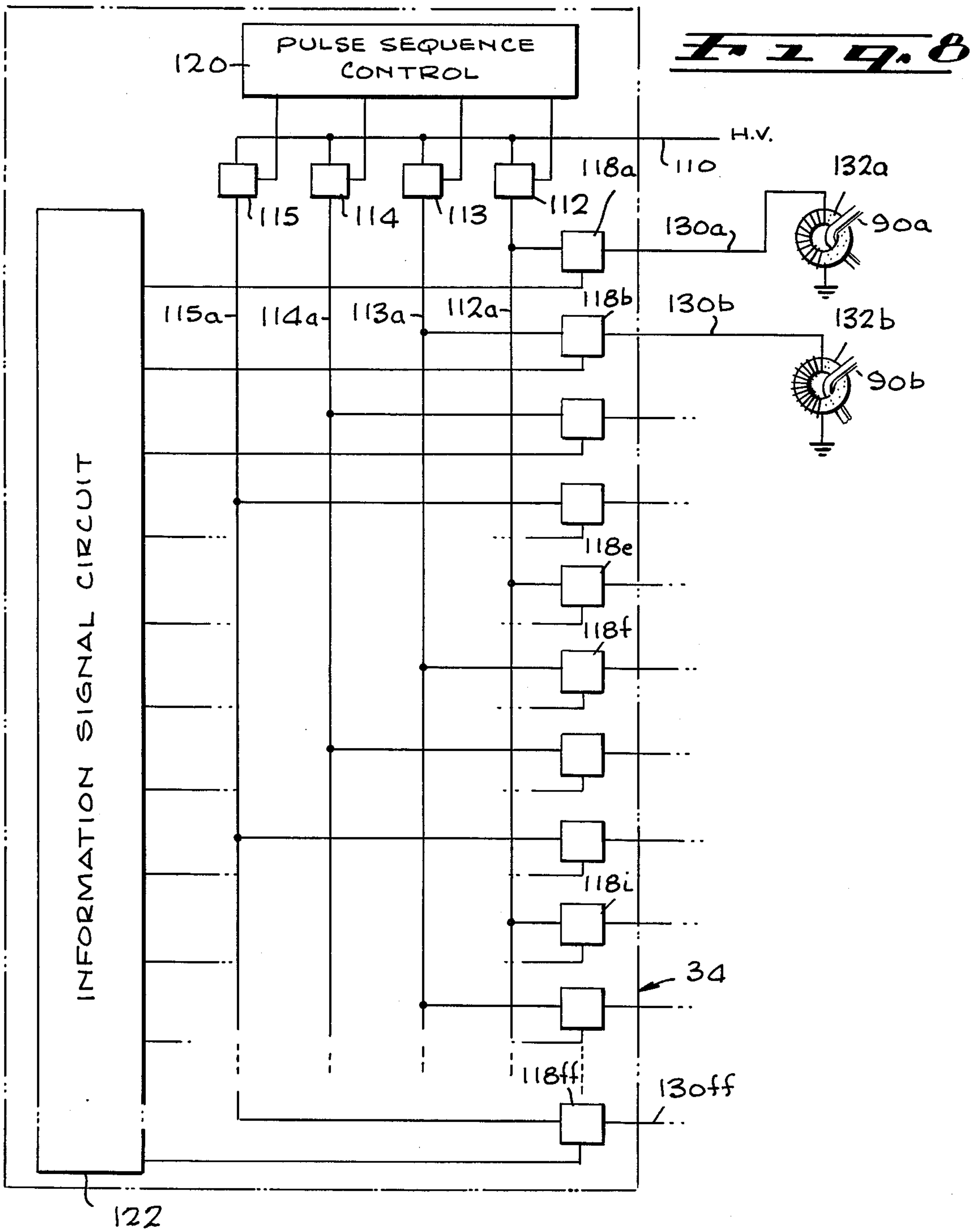
FIG. 8 is a partial block diagram of the signal processor of the machine of FIG. 2.

When current pulses are passed through two adjacent recording elements, the magnetic fields of the two elements interfere and can prevent the formation of small definite recording spots. In fact, it has been found in recording device testing that the passage of current pulses simultaneously through two print elements that are separated by only one other element can produce enough magnetic field interference to detract from the image. Accordingly, it is preferable to pass pulses simultaneously through only one out of each four recording elements. FIG. 8 illustrates a portion of the signal processor 34 which controls the passage of currents through the print elements 60*a*–60*ff* to prevent image degradation from interaction of magnetic fields. Current from a voltage source is supplied on line 110 to four sequence gates 112–115 which can deliver the current through lines 112*a*–115*a* to a series of control gates 118*a*–118*ff* that are connected to the tails 90*a*–90*ff* of the print elements 60*a*–60*ff*. The gates 112–115 are controlled by a pulse sequence control circuit 120, while the gates 118*a*–118*ff* are controlled by an information signal circuit 122. When a column of spots is to be recorded on the magnetic tape, all of the gates 118*a*–118*ff* are opened. The control circuit 120 then opens sequence gate 112 for a brief period, to permit a brief pulse of current to flow through the gate 112 and thence through the group of eight gates 118*a*, 118*e*, 118*i*, etc. A brief time later, when gate 112 is closed, the next sequence gate 113 is briefly opened to permit a current pulse to flow through the next group of eight gates 118*b*, 118*f*, etc. This is repeated for the next two sequence gates, 114 and 115. The choice of which control gates 118 will be left open during the entire period when any of the sequencing gates 112–115 are opened, is determined by the information circuit 122 which opens only those gates 118 which are needed to form portions of the character to be printed.

Figure 9:
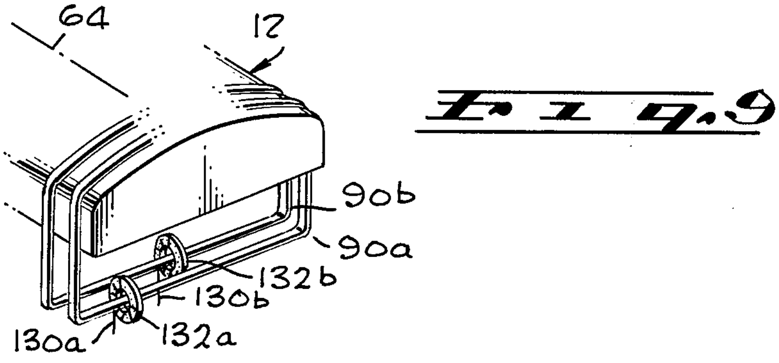
FIG. 9 is a partial perspective view of the head apparatus of FIG. 3, showing the manner in which current is coupled to the elements thereof.

The coupling of current on an output line of the signal processor such as 130*a* (FIG. 8) to a lead 90*a* of a recording element, is accomplished in a manner that minimizes the inductance of the recording element and which matches the very low impedance of a common driving circuit. This is accomplished by utilizing a separate torroidal ferrite core 132*a*–132*ff* for each element, with the output line such as 130*a* wound many times (such as 20) about the core 132*a* and with a corresponding element lead 90*a* passing only once through the core. The resulting configuration is illustrated in FIG. 9, wherein each element lead 90*a*–90*ff* is of a configuration that results in low impedance so that a large current pulse such as 10 amperes can be carried through it utilizing a voltage source that supplies only a moderate voltage and current, such as 30 volts and 0.3 amperes, to the output lines 130*a*–130*ff* to facilitate the use of low cost transistor circuitry for the gating.

In one printing machine of the invention, the recording elements are three mil (0.003 inch) apart along the recording line 64, with each element being approximately 1.5 mil in width, and with each element having a nickel layer 70 of 0.25 mil thickness, a copper layer 72 of 1 mil thickness, and a gap 78 of 1 mil length. It may be noted that a thicker copper layer may be desirable, but it is difficult to etch a much thicker layer, even if both sides of the nickel-copper sandwich are etched, where such close spacing of the recording elements is utilized. A current pulse of 10 ampere and 1 microsecond duration is passed through each recording element, and the four groups of pulses for the four groups of eight elements each, are separated from one another by 2 microseconds. Current pulses with rise times of 1 microsecond are easily obtained in passage through the elements. Of course, the small cross-section of the elements would prevent them from carrying a continuous current of the order of magnitude of 10 amperes, but they can conduct such a current for a microsecond without damage. Each new column of spots is recorded on the magnetic recording tape 18 at 60 microsecond intervals. All of the spots of a column lie almost along a line, a maximum time separation of 3 microsecnds between any two spots of a column being much less than the separation of 60 microseconds between adjacent columns. The tape 18 is moved at a speed of 50 inches per second, so that adjacent columns of spots are spaced at 3 mil intervals on the magnetic recording tape.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A recording apparatus comprising:
a magnetizeable tape;
means for moving said tape along a predetermined path; and
a recording head assembly positioned along said path, for forming magnetic images on said tape;
said recording head assembly including a plurality of recording elements having electrically conductive portions in the form of narrow strips that extend parallel to one another in a direction substantially parallel to the length of the tape path portion thereat and that lie close to said tape path, each strip forming a current path extending largely along its length with the center of the current path lying more than a predetermined distance from said tape path except at a predetermined short length portion of said strip where the center of said current path lies closer than said predetermined distance from said tape path; and
means for applying current pulses selectively to said narrow strips with each current pulse having an amplitude large enough to magnetize a nearby portion of said tape as said current moves through the corresponding short length portion of a strip, but small enough so the current does not magnetize said tape as the current moves through the rest of the narrow strip.

2. A method for forming a magnetic image of a magnetizeable medium, comprising:
passing currents along a plurality of substantially parallel paths spaced from said magnetizeable medium by more than a predetermined distance from said medium except along path portions of limited length which are closer to said medium than said predetermined distance, where each of said currents is of a magnitude which causes magnetization of the medium only when moving along a corresponding path portion but not when moving along the rest of the path which is more than said predetermined distance from said medium.

3. The method described in claim 2, wherein:
said magnetizeable medium moves relative to said current paths; and
said current is passed in short pulses through alternate groups of said paths, wherein adjacent paths of the same group are spaced apart by at least twice the distance between adjacent paths, and then no current is passed through any of said routes for a time period which is many times longer than the duration of said pulses.

4. In a magnetic recording apparatus wherein a magnetizeable medium extends along a predetermined path, the improvement of a magnetic recording head positioned along said path comprising:

a recording element which includes an electrical conductor portion having a first layer of nickel positioned near said path and a second layer of copper positioned over and electrically coupled to a face of said first layer opposite said path, said conductor portion being devoid of said second layer at said recording location.

5. A recording apparatus comprising:

a magnetizeable tape;

means for moving said tape along a predetermined path; and a recording head assembly positioned along said path, for forming magnetic images on said tape;

said recording head assembly including a supporting film of electrically insulative material, and a plurality of electrically conductive narrow strips that extend parallel to one another in a direction substantially parallel to the length of the tape path portion thereat and that lie on a side of said supporting film which is opposite said tape path, each strip including a first layer of a first material and a second layer of a second material, said first layer positioned between said supporting film and said second layer, and said second layer having a higher conductivity than said first layer;

said second layer of said strips having gaps therein, with said gaps of said strips arranged substantially along an imaginary recording line extending substantially perpendicular to the length of said strips.

6. In a magnetic recording apparatus wherein a magnetizeable medium extends along a predetermined path, the improvement of a magnetic recording head positioned along said path comprising:

a recording element which includes an electrical conductor portion with a center of conduction spaced from said path by more than a first distance except along a recording location of limited length where said center of conduction is spaced from said path by a second distance which is closer than said first distance to said path; and means for passing a current through said conductor portion;

said current passing means being constructed to pass a current of an amplitude that will change the magnetization of said magnetizeable medium when said current is at said second distance from said path of said medium, but not when said current is at said first distance from said path of medium.

7. In a magnetic recording apparatus wherein a magnetizeable medium extends along a predetermined path, the improvement of a magnetic recording head positioned along said path comprising:

a recording element which includes an electrical conductor portion with a center of conduction spaced from said path by more than a predetermined distance except along a recording location of limited length where said conductor portion is formed with the center of conduction thereat is closer than said predetermined distance to said path; and means for passing a current through said conductor portion;

said electrical conductor portion comprising a narrow strip with a narrow recess therein at said recording location, said recess being formed in the side of said strip which is furthest from said path of said magnetizeable medium and extending only part of the way through the thickness of said strip.

8. The improvement described in claim 7, wherein:

said strip comprises a first layer of electrically conductive material positioned near said path, and a second layer positioned directly against a face of said first layer opposite said path, the material of said second layer having a greater conductivity than the material of said first layer, and said recess being formed through the thickness of said second layer.

9. The improvement described in claim 7 wherein:

said strip is tapered in width along its thickness, with a minimum width at the face thereof which is nearest said path of said magnetizeable medium.

10. In a magnetic recording apparatus wherein a magnetizeable medium extends along a predetermined path, the improvement of a magnetic recording head positioned along said path comprising:

a plurality of recording elements, each including an electrical conductor portion with a center of conduction spaced from said path by more than a predetermined distance except along a recording location of limited length where said center of conduction is closer than said predetermined distance to said path, said recording locations being arranged substantially along a line and being closely spaced therealong;

said recording elements being arranged in groups, with the recording locations of any two recording elements of a group being spaced far enough apart that at least one recording location of an element of another group as located between them; and an energizing circuit coupled to said recording elements for passing current pulses selectively therethrough, said circuit passing said pulses simultaneously through some elements of a group of print elements while substantially no current passes through elements of any other group, and then passing current through some elements of another group of elements.

* * * * *